United States Patent [19]
Harrington

[11] 3,965,271
[45] June 22, 1976

[54] METHOD FOR PACKAGING CHEESE CURD
[75] Inventor: Frank C. Harrington, Danville, Ill.
[73] Assignee: Continental Can Company, Inc., New York, N.Y.
[22] Filed: Aug. 19, 1974
[21] Appl. No.: 498,483

[52] U.S. Cl. ............................ 426/515; 229/3.5 R; 229/48 T; 426/127; 426/130; 428/508; 428/536; 428/910; 426/414
[51] Int. Cl.² ........................................ A01J 25/13
[58] Field of Search ........... 426/127, 130, 410, 413, 426/414, 415, 582, 512, 515, 517; 229/3.5 R, 48 T; 428/508, 536, 910

[56] References Cited
UNITED STATES PATENTS

| | | | |
|---|---|---|---|
| 2,919,059 | 12/1959 | Sporka | 229/3.5 R |
| 3,037,868 | 6/1962 | Rosser | 428/508 X |
| 3,248,040 | 4/1966 | Friedman | 229/3.5 R X |
| 3,260,776 | 7/1966 | Lindstrom, Jr. et al. | 428/910 X |
| 3,274,004 | 9/1966 | Curler et al. | 229/3.5 R X |
| 3,429,717 | 2/1969 | Cook | 426/127 |
| 3,630,826 | 12/1971 | Rose et al. | 426/127 X |
| 3,843,808 | 10/1974 | Ziccarelli | 426/582 |

Primary Examiner—Frank W. Lutter
Assistant Examiner—William Cuchlinski, Jr.
Attorney, Agent, or Firm—Paul Shapiro; Joseph E. Kerwin; William A. Dittman

[57] ABSTRACT

This invention relates to an improvement in a process for producing a cheese product wherein a cheese curd is extruded through a nozzle into a flexible, tubular mold, solidified to form a cheese product, and then removed from the flexible mold and the resulting product. The improvement is the use in the process of a "duplex type" mold constructed of an outer film laminate comprising a first film ply of cellophane having bonded to its outer surface a gas impermeable film having a gas transmission rate of less than about 10 cc/100 in.²/24 hour-atm.;

a second film ply of biaxially oriented polypropylene bonded to the inner surface of said cellophane; and an inner film comprising a film ply of biaxially oriented polypropylene.

8 Claims, 4 Drawing Figures

METHOD FOR PACKAGING CHEESE CURD

BACKGROUND OF THE INVENTION

In the manufacture of certain types of cheese products, a cheese curd is extruded through a nozzle into a flexible tubular mold of typically 2 – 6 inches in diameter and a length of from 5 – 6 feet, solidified or allowed to "knit", and then removed from the mold leaving a solidified cheese product.

This product is cut to uniform length or slice thickness so as to get uniform specific weight. Two problem areas were noted with the conventional flexible tubular molds in the manufacture of cheese products by this process. One was that the tubular mold did not have sufficient resistance to cracking or breaking, particularly when the tubular mold was shirred onto a mandrel prior to extrusion of the curd into the mold. The second was that the mold did not have sufficient rigidity and toughness to permit the forming of a cheese product having uniform size so that when it was cut to a uniform length or slice thickness it would yield a product of specific weight. Quite often, the tubular mold stretched erratically under the high stuffing pressures, e.g., 5 – 10 psi, causing the cheese product to be irregular in size. On a large commercial scale, accurate size control is imperative for obtaining uniform weight.

DESCRIPTION OF THE PRIOR ART

It has been proposed in the manufacture of cheese products to employ flexible tubular molds comprising a film laminate of a first saran ply coated on both sides with a polyethylene film and this laminate joined with an adhesive to a second polyethylene film to form a single laminate. Unfortunately, the polyethylene in the flexible tubular film package did not provide sufficient dimensional stability to obtain the necessary size control required in the cheese making process described.

It has also been proposed to employ a duplex film mold comprising an outer laminate of a first polypropylene film coated on both sides with a saran resin and this film joined with an adhesive to a second polypropylene film identical to the first film, and an inner laminate of the same construction as the outer laminate. The outer and inner laminates were not jointed except at the seam for making a tubular construction. Although this flexible tubular mold had outstanding moisture impermeability and flexibility, it, like the previous flexible mold, did not have the dimensional stability required for the necessary size control in the cheese manufacturing process.

One type of flexible tubular mold employed on a commercial scale is a saran coated, reinforced, regenerated cellulose (fibrous) casing. Although these molds had good dimensional stability for permitting accurate size control of the cheese product, their main disadvantage was that these molds had to be moistened or soaked in water in order to obtain the flexibility required for shirring and stuffing. Minor disadvantages were: (1) the molds were difficult to produce in precise diameter and (2) the molds could not tolerate pressures much above the stuffing pressure without breaking. In other words, they did not have sufficient elasticity above the stuffing pressure so as to eliminate the possibility of breakage due to imprecise process control.

There are a number of film packages on the market today which comprise a laminate of dissimilar material such as a laminate of cellophane bonded to polyethylene or polypropylene and coated with a moisture impervious material. Examples of such film packages are shown in U.S. Pat. No. 2,919,059; 3,415,286; and 3,248,040. However, these film packages are unsuited to the manufacture of cheese products by the process contemplated herein in that they primarily do not afford the dimensional stability required in the process.

SUMMARY OF THE INVENTION

This invention relates to an improvement in a process for producing a cheese product wherein a cheese curd is extruded through a nozzle into a flexible tubular mold, solidified, and then removed from the mold and the resulting product. The improvement broadly resides in the utilization of a duplex type flexible tubular mold which comprises:

an outer film laminate having a first film ply of cellophane having bonded to its outer surface of gas impermeable film having a gas transmission rate of less than 10 cc/100 in.$^2$/24 hour-atm. and bonded to its inner surface, the inner surface of the film ply of biaxially oriented polypropylene; and an inner film comprising a biaxially oriented polypropylene film.

In a preferred embodiment of the invention, the outer film laminate comprises a film ply of cellophane having a saran coating bonded to its outer surface with the saran coating having a hydrophilic, anti-blocking or release agent on the surface thereof and an inner saran coating bonded to the inner surface of the cellophane ply for providing increased impermeability to moisture and gaseous vapor. In addition, the film ply of biaxially oriented polypropylene in the outer film laminate has a saran coating bonded to its inner and outer surfaces.

The inner film of the preferred embodiment is an inner film laminate comprising a film ply of biaxially oriented polypropylene having a saran coating bonded to each of its surfaces.

The outer film laminate is combined so that the saran coated film ply or polypropylene is bonded to the saran coating applied to the inner wall of the cellophane via an adhesive.

The duplex type flexible tubular mold described herein and employed in the processing of the cheese has many advantages over the flexible molds including the duplex type molds employed in the past. These advantages include:

a tough flexible tubular mold which can be shirred without danger of cracking or rupture even without prior wetting of the mold;

a flexible tubular mold which has excellent dimensional stability, e.g., about 0.5% for a 5 – 6 inch diameter mold and about 1 – 2% for a 2 – 3 inch diameter mold measured at the desired stuffing diameters and stuffing pressures of 5 psig for the large molds and 10 psig for the smaller molds for permitting accurate diameter and size control of cheese products;

a flexible tubular mold having substantial elasticity at pressures above the stuffing pressure should process conditions become irregular;

a flexible tubular mold having desirable moisture and vapor impermeability for retaining moisture in the cheese product processed therein;

a flexible tubular mold having outstanding lubricity for reducing friction in process equipment;

a flexible tubular mold which is highly resistant to tearing caused by metal burrs in process equipment; and a flexible tubular mold having commercial economics.

THE DRAWINGS

DESCRIPTION OF THE PREFERRED EMBODIMENTS

Figure 1:
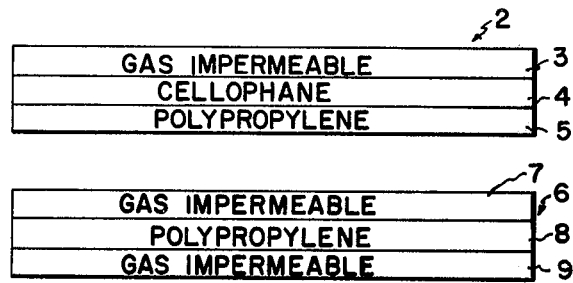
FIG. 1 is a view in elevation of two laminates used for making the flexible tubular mold.

In referring to the drawings, FIG. 1 represents a view in elevation of two laminates used in forming the duplex type flexible tubular mold for the manufacture of certain classes of cheese products. Outer laminate 2 comprises a regenerated cellulose (cellophane) ply 4 having bonded to its outer surface a gas impermeable film 3 and a biaxially oriented polypropylene film 5 bonded to its inner surface. An inner film 6 consists of biaxially oriented polypropylene film and it is bonded to the cellophane film for making the outer laminate. In the preferred embodiment, the inner film is a laminate of biaxially oriented polypropylene having a gas impermeable film 7 bonded to its inner surface and a gas impermeable film 9 bonded to its outer surface.

The unique combination of film components in the outer and inner film, and particularly the outer and inner film laminates, produces a flexible tubular mold which has excellent dimensional stability, flexibility, and toughness. The cellophane ply or ply of regenerated cellulose adds substantial dimensional stability to the flexible tubular mold which is not obtained from molds not employing the cellophane or regenerated cellulose ply. It, therefore, is a necessary component for forming the outer laminate.

The polypropylene film used in forming the outer and inner film of the tubular mold is biaxially oriented polypropylene. Polypropylene provides toughness and flexibility to the mold. It is necessary that biaxially oriented polypropylene be used so that isotropic properties in the film are obtained. Polypropylene film which is not biaxially oriented does not provide the dimensional stability and toughness required in the flexible mold for the processing of the cheese products contemplated herein. Polyethylene has been substituted for biaxially oriented polypropylene but the resulting flexible mold does not have the toughness and stretch resistance that the mold has when the polypropylene is used. Such properties are required by commercial manufacturers and, therefore, polyethylene is not acceptable as a substitute for the biaxially oriented polypropylene. Further, as is known, it is difficult to obtain biaxially oriented polyethylene and, therefore, the strength properties of the film are not substantially isotropic.

The gas impermeable films (typically coatings noted in FIG. 1 as film 3 in the outer laminate and 7 and 9 in the inner laminate) are resistant to both gas and moisture vapor transmission. These films or coatings are added primarily for the purpose of providing gas, and particularly moisture impermeability, to the flexible tubular mold. These films should have a moisture and gas transmission rate of less than about 10 cc/100 in.$^2$/24 hour-atm.(60°F.) so that the moisture in the cheese product will be retained. The cheese products lose aesthetic appeal, as well as flavor, when moisture is lost during storage and as a result become unsaleable. A further purpose of the gas impermeable films is to keep the cellophane or regenerated cellulose ply in a "dry" state. As is known, cellophane or regenerated cellulose films lose their dimensional stability and stretch resistance when wet. In a preferred embodiment, as noted in FIG. 2, the gas impermeable films are mutually compatible for heat sealing. By appropriate selection of gas impermeable films having the quality of being heat sealable, flexible tubular molds can be manufactured and sealed by conventional commercial techniques. Preferably, the gas impermeable films are polyvinylidene chloride or inter polymers thereof (saran). Saran films are highly desirable because of their very low gas and moisture vapor transmission rates and their ability to be heat sealed.

Figure 2:
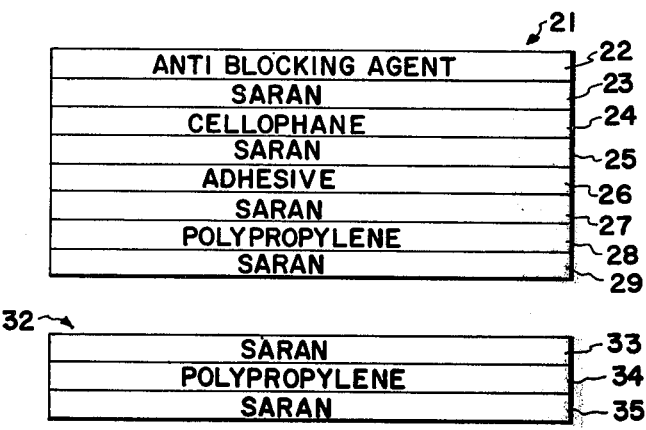
FIG. 2 is a view in elevation of a preferred embodiment of the two laminates used for making the flexible tubular mold.

FIG. 2 is a view in elevation of the preferred outer and inner laminates employed for forming the duplex type mold. In outer laminate 21, cellophane ply 24 has a thin film or coating of saran 23 on its outer surface and a thin film of saran 25 on its inner surface. The cellophane ply typically has a thickness of from about 0.8 to 1.6 mils and each of the saran films 23 and 25 have a thickness of from about 0.1 – 0.3 mils. The outer saran film 23 preferably has an anti-sticking or anti-blocking (release) agent coated thereon. Anti-blocking or release agents, e.g. alkyl sulfates, alkyl sulfonates such as sodium lauryl sulfonate and polyethyleneimine, are widely used for coating saran films to improve the lubricity thereof for extrusion through process equipment. The release agent generally is applied to the saran film in a proportion of about 7 mg./sq. meter for polyethyleneimine and about 3 mg./sq. meter for sodium lauryl sulfate. These proportions are conventional and are well known in the art.

Biaxially oriented polypropylene film 28 employed in outer laminate 21 has saran films 27 and 29 bonded to its inner and outer surfaces. These films, like the saran films on the cellophane ply, typically are coatings having a thickness of from about 0.1 – 0.3 mils. Biaxially oriented polypropylene film 28 has a thickness of from about 0.5 to 1.5 mils.

The materials employed in the outer film laminate 21 in a preferred embodiment afford two convenient and relatively easy means for bonding the cellophane ply to the polypropylene ply. One convenient means is to thermally seal the saran films 25 and 27 together to form an integral unit. Another means, and this is preferred, is to bond the cellophane and polypropylene film plies together by applying adhesive 26 (as shown in FIG. 2) to saran films 25 or 27 and then curing the adhesive to form a bond.

The adhesive employed in bonding the saran coated cellophane ply to the saran coated polypropylene ply should have sufficient strength to bond the cellophane and polypropylene plies together to withstand the stress imposed during stuffing and yet have sufficient flexibility so that when the resulting laminate is formed it does not undergo stress cracking when shirred on the stuffing horn. Classes of adhesive which can be used for practicing the invention include: urea aldehyde, melamine formaldehyde, polyalkylene polyamine, guanidine urea aldehyde, carbamide aldehyde, polymeric isocyanate, polymeric polyisocyanate (often crosslinked with polyhydric alcohol), polyurethane isocyanate, or polyamide-epichlorohydrin. Such adhesives are well known in the art for bonding such polymeric films.

The inner film, in the broad sense, comprises biaxially oriented polypropylene film having a thickness of from about 0.5 – 1.5 mils. As shown in FIG. 1 and more particularly in FIG. 2 is a laminate having a gas impermeable film applied to both its inner and outer surfaces. As noted in FIG. 2, the inner laminate 32 has saran films 33 and 35 applied to its inner and outer surfaces. These films have a thickness of from about 0.1 – 0.3 mils. These films provide for increased moisture impermeability and provide for heat sealability.

In some instances where cheese is stuffed at higher pressures than the 10 psi commonly used for the smaller molds, inner film laminate 32 can be made of the same construction as outer laminate 21. In other words, inner laminate 32 would contain a cellophane ply bonded to a biaxially oriented polypropylene ply and have the appropriate saran films applied thereto. As might be expected, the additional cellophane ply in the inner laminate would provide for greater strength required for the higher stuffing pressure.

Figure 3:
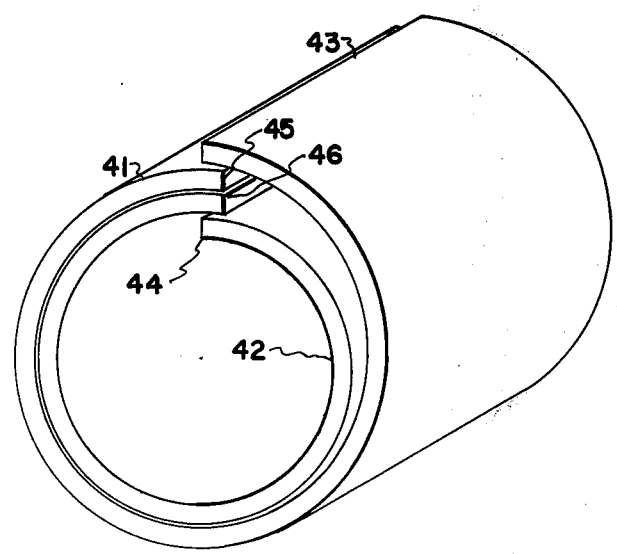
FIG. 3 is an oblique view of the flexible tubular mold formed from the laminates described in FIGS. 1 and 2 with particular emphasis on the construction and sealing of the mold.

Referring to FIG. 3, there is shown an oblique view of the film laminates of FIG. 2 positioned to show the construction of the seam for the duplex type flexible tubular mold. More particularly, in describing the construction, outer laminate 41 and inner laminate 42 are laid one over the other and formed into a tubular shape. Edges 45 and 46 of the outer and inner film laminate, respectively, are pressed together and disposed between opposite edges 43 and 44 of the respective outer and inner laminate. In other words, one end of the outer and inner laminate is sandwiched and sealed between the opposite ends of the respective outer and inner laminates. Preferably, heat sealing is used for making the seam, although other sealing means, e.g., adhesive, can also be used. The duplex construction can be made by alternating the edges of the laminates, i.e., sandwiching the edges of the laminates together in alternate fashion. However, this construction is difficult to obtain on a commercial scale and to date shows no apparent advantage over the configuration described in FIG. 3. A "butt" seam can also be substituted for the other types of seam described above but to date this type of seam has not afforded the commercial advantages in terms of the strength desired.

In the duplex type construction of the tubular mold, the outer laminate is separate from the inner laminate. Separability apparently is necessary for obtaining the desired flexibility and strength. Separability permits the films to slide against each other to alleviate stress and reduce tearing. Quite often when the outer and inner laminates are sealed, e.g., by thermal means or by adhesives, the mold tears or ruptures presumably because of tension at the outer surface and compression at the inner surface. The flexible tubular molds of this invention can be formed with the apparatus shown in FIG. 4. The apparatus provides a convenient method for producing the tubular molds and permits the formation of a mold having a substantially uniform diameter.

Figure 4:
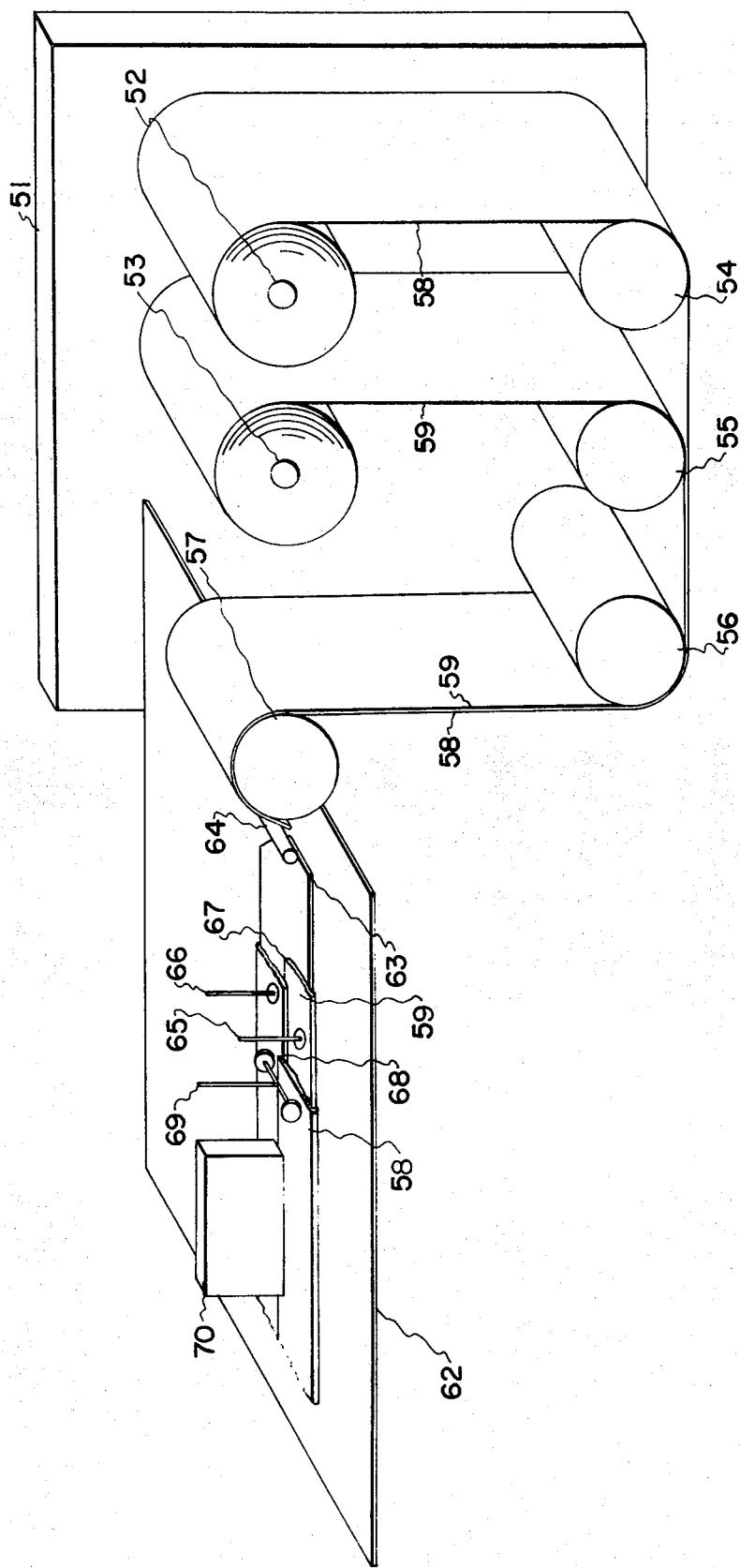
FIG. 4 is an oblique view of an assembly suited for manufacturing flexible tubular molds of this invention.

In viewing FIG. 4, frame 51 carries or supports a series of rollers 52, 53, 54, 55, 56, and 57. Reel film stock comprising outer laminate film described in FIG. 2 is carried by roller 52. Reel film stock 59 comprising inner laminate film material described in FIG. 2 is carried by roller 53. The outer laminate 58 and inner laminate 59 are passed underneath rollers 55 and 56 and thereby brought in juxtaposition one over the other. Tension is applied to both the outer and inner laminates by bringing the laminates up and over roller 57. Slight tension aids in removing wrinkles which gather between the film laminates. The laminates then are passed over table 62 and underneath tube sizer 63 which is supported on table 62. The tube sizer is a straight sided flat steel plate of about one-half the width of the laminates so that the flat stock can be molded about the tube sizer to produce a tubular shaped mold. Tube sizer 63 has rounded edges so that the film laminates can slide underneath and along the tube sizer during the manufacturing process. Tube former 64 is supported so that it is slightly above and in front of tube sizer 63. Tube former 64 is a roller and contacts film laminates 58 and 59 causing their ends to curl inward and over the top of tube sizer 63 to form a tubular shape. Thus, as is noted in FIG. 4 a portion of the outer and inner film laminate is caused to slide underneath tube sizer 63 and the remainder folded over the top of tube sizer 63 so that the edges contact each other at or about the middle of tube sizer 63 for forming a tubular shape.

The flexible tubular mold is positioned for sealing by causing hold-down bar 65 to press edge 67 of inner laminate 59 down and onto tube sizer 63. Another hold-down bar 66 presses the opposite edges of both the outer and inner laminates 58 and 59 down and over edge 67 of inner laminate 59. Edge 68 of the outer laminate 58 then is folded over the opposite edges of laminates 58 and 59. Hold-down bar 69 presses against edge 68 and against the complete unit for sealing. When assembled, heat-sealing bar 70 is pressed against the edges of the laminates forming a continuous flexible tubular mold having a seal extending on the surface of the mold. The continuous flexible tubular molds then are cut to size, e.g., 5 – 6 feet in length, sometimes clipped at one end, and packaged for sale to the cheese processor.

Although the above description of the drawings illustrate preferred embodiments of the invention, they are not intended to restrict the scope of such invention.

I claim:

1. In a process for producing a cheese product wherein a cheese curd is extruded through a nozzle into a flexible tubular mold, permitted to solidify or knit, and then removed from the mold to form a cheese product, the improvement which comprises:
    employing as said mold, a flexible tubular mold having (a) an outer film comprised of a laminate of a first film ply of cellophane having bonded to its outer surface a second film ply having a gas transmission rate of less than 10 cc/100 in.$^2$ /24 hour-atm. and a third film ply of biaxially oriented polypropylene bonded to the inner surface of the cellophane ply, and (b) an inner film comprised of a fourth film ply of biaxially oriented polypropylene.

2. The process of claim 1 wherein the inner film of biaxially oriented polypropylene has fifth and sixth film plies bonded to its inner and outer surfaces each of the fifth and sixth film plies having a gas transmission rate of less than 10cc/100 in.$^2$ /24 hour-atm.

3. The process of claim 2 wherein the films bonded to the cellophane ply and to the biaxially oriented polypropylene film plies are saran films.

4. The process of claim 1 wherein the cellophane ply of the outer film laminate has bonded thereto a film having a gas transmission rate of less than 10cc/100 in.$^2$ /24 hour-atm. intermediate the inner surface of the cellophane ply and the third biaxially oriented polypropylene film ply as well as to the outer surface of the third film ply.

5. The process of claim 1 wherein the edges of the outer film and the inner film are joined together to form a seam extending longitudinally along the surface of the tubular mold.

6. The process of claim 1 wherein the seam is formed by heat sealing.

7. The process of claim 6 wherein said seam is formed by disposing an edge of said outer film and inner film between the opposite edges of said outer and inner films.

8. The process of claim 1 wherein the saran film bonded to the outer surface of the cellophane ply has a release agent thereon.

* * * * *